(12) United States Patent
Kallstenius

(10) Patent No.: US 7,343,164 B2
(45) Date of Patent: Mar. 11, 2008

(54) CELLULAR COMMUNICATIONS SYSTEM EMPLOYING WIRELESS OPTICAL LINKS

(75) Inventor: Thomas Kallstenius, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/495,768

(22) PCT Filed: Nov. 6, 2002

(86) PCT No.: PCT/SE02/02010

§ 371 (c)(1),
(2), (4) Date: Feb. 3, 2005

(87) PCT Pub. No.: WO03/047130

PCT Pub. Date: Jun. 5, 2003

(65) Prior Publication Data

US 2005/0123301 A1    Jun. 9, 2005

(30) Foreign Application Priority Data

Nov. 30, 2001 (SE) .................................. 0104036

(51) Int. Cl.
*H04Q 7/20* (2006.01)

(52) U.S. Cl. .................. 455/453; 455/436; 455/442; 455/450; 455/452.1; 370/329; 370/331; 370/341

(58) Field of Classification Search .......... 455/453, 455/436, 450, 451, 452.1, 442; 370/341, 370/331, 332, 229, 329
See application file for complete search history.

(56) References Cited

U.S. PATENT DOCUMENTS 5,673,259 A * 9/1997 Quick, Jr. .................. 370/342

| 5,740,535 | A | * | 4/1998 | Rune ........................ 455/437 |
| 5,844,705 | A | * | 12/1998 | Rutledge .................... 398/66 |
| 5,862,489 | A | * | 1/1999 | Aalto ........................ 455/522 |
| 6,239,888 | B1 | | 5/2001 | Willebrand |
| 6,246,874 | B1 | * | 6/2001 | Voce ......................... 455/428 |
| 6,314,163 | B1 | | 11/2001 | Acampora |

(Continued)

OTHER PUBLICATIONS

Patent Abstracts of Japan, vol. 1997, No. 01, Jan. 31, 1997 & JP 08 237202 A (Sony Corp), Sep. 13, 1996.

(Continued)

*Primary Examiner*—Nghi H. Ly
(74) *Attorney, Agent, or Firm*—Nixon & Vanderhye, P.C.

(57) ABSTRACT

The invention relates to a cellular communication system based on a central main unit, a primary-cell communication unit connected to the central main unit, and a number of secondary-cell communication units. Each secondary-cell unit is connected to the primary-cell unit via a respective wireless optical link. The secondary-cell communication units are preferably remote radio units in a distributed radio base system, where each remote radio unit forms a distributed radio base station together with the central main unit. The wireless optical link quality is measured to detect reduced link availability. The invention compensates for insufficient link availability by providing adequate radio coverage from another communication unit within the cellular system and re-directing the radio traffic to that communication unit. Adequate radio coverage from another communication unit within the cellular system and re-directing the radio traffic to that communication unit. Adequate radio coverage is accomplished either by dynamically increasing the radio coverage or using a micro-macro cell architecture.

24 Claims, 10 Drawing Sheets

U.S. PATENT DOCUMENTS

| | | |
|---|---|---|
| 6,366,571 B1 * | 4/2002 | Fiut et al. .................... 370/342 |
| 6,594,489 B2 * | 7/2003 | Holcman ................. 455/432.1 |
| 6,606,497 B2 * | 8/2003 | Mohebbi .................... 455/437 |
| 6,708,041 B1 * | 3/2004 | Butovitsch et al. ......... 455/522 |
| 6,728,528 B1 * | 4/2004 | Loke .......................... 455/318 |
| 6,950,678 B1 * | 9/2005 | Mujtaba et al. .......... 455/562.1 |

OTHER PUBLICATIONS

Yamaguchi et al, "Integration of Micro and Macro Cellular Networks for Future Land Mobile Communications", International Conference on Universal Personal Communications, IEEE, New York, NY, US, vol. 2, Oct. 12, 1993, pp. 737-741.

International Search Report mailed Feb. 26, 2003 in corresponding PCT appln. No. PCT/SE02/02010.

* cited by examiner

CELLULAR COMMUNICATIONS SYSTEM EMPLOYING WIRELESS OPTICAL LINKS

This application is the U.S. national phase of international application PCT/SE02/02010 filed in English on 6 Nov. 2002, which designated the U.S. PCT/SE02/02010 claims priority to SE Application No. 0104036-9 filed 30 Nov. 2001. The entire contents of these applications are incorporated herein by reference.

TECHNICAL FIELD OF THE INVENTION

The present invention generally concerns cellular communication systems, and more particularly dense-cell mobile networks and the need for increased communication capacity in such networks.

BACKGROUND OF THE INVENTION

Future generation mobile networks and other cellular communication systems will generally require a higher density of radio base stations and higher data rates compared to previous network generations. An efficient way of addressing this problem is to distribute remote radio units of relatively low complexity at suitable locations over a given network area and interconnect the remote radio units to a central main unit using optical fiber. This main-remote concept, which is sometimes referred to as Fiber-To-The-Antenna (FTTA), gives a virtually unlimited data rate between the main unit and the remote radio units. The main-remote concept provides a very cost-effective way of distributing radio heads if fiber already exists or can be deployed easily. In urbanized areas, however, it is often difficult and expensive to install or rent fiber. The waiting time for deploying fiber can also be considerable. The latter may be a crucial factor for operators, which may loose market shares and even be subjected to order of punishment if the deployment is not completed in time.

Free-space optics is an interesting alternative to fiber that can be used for providing cost-effective point-to-point communication. The main advantage of using free-space optical communication links is that hard-wired connections are avoided. Free-space optical links are easily deployed and may provide data rates comparable to those of optical fibers.

U.S. Pat. No. 5,844,705 describes a communication system employing free-space optical links. A conventional cell in a wireless communication system is divided into a number of sub-cells, each of which is served by a respective radio antenna. Each sub-cell antenna includes an optical transceiver that communicates with the central unit, formerly serving the overall cell, via a respective free-space optical link. The central unit is converted from a radio frequency transceiver to a set of optical transceivers for optical communication with the sub-cell transceivers.

A major source of concern, however, is the availability of the free-space links, or wireless or fiberless optical links as they are often called, since the link quality is highly dependent on the atmospheric conditions. For example, it is well known that wireless optical links are sensitive to snow, fog, smoke and dust. One way of reducing the adverse influences of so-called atmospheric attenuation is to use laser beam transmissions at frequencies allowing greater penetration and less absorption or scattering by atmospheric influences.

U.S. Pat. No. 6,239,888 describes an all-optical integration of optical fibers and wireless optical links by means of erbium-doped fiber amplifiers. Erbium-doped fiber amplifiers are generally capable of providing all-optical, broadband amplification at optical frequencies compatible with those used in optical fibers.

Other approaches for addressing the availability problem of wireless optical links include multi-beam configurations and microwave back-up to provide secure point-to-point communication.

All these approaches have two things in common—they focus on increasing the link availability and they are expensive.

U.S. Pat. No. 6,314,163 describes a hierarchical architecture with picocells interconnected by free-space optical links, with a standard cell providing alternate back-up access.

BRIEF SUMMARY

The present invention overcomes these and other drawbacks of the prior art arrangements.

It is a general object of the present invention to provide a cost-effective mechanism that allows the use of wireless optical links without discriminating the reliability of the cellular communication system. It is of particular interest to accomplish this without any additional back-up equipment for point-to-point communication.

It is also an object of the invention to provide a robust and cost-effective dense-cell mobile network. In particular, it is desirable to maintain high and stable network availability in such a network even though wireless optical links are utilized.

Another object of the invention is to provide a method of operating a cellular communication system in such a way that limited availability of wireless optical links in the system does not prevent user-communication within the system.

Yet another object of the invention is the ability to deploy a plurality of remote radio units without being limited to multiplexing techniques such as time division multiplexing and optical wavelength multiplexing.

The invention concerns a cellular communication system that comprises a plurality of radio-based communication units. The cellular architecture is based on a central main communication unit, a primary-cell communication unit connected to the central main unit, and a number of secondary-cell communication units. Each secondary-cell communication unit is connected to the primary-cell communication unit via a respective wireless optical link to enable rapid, low-cost deployment of radio-based communication units in the system.

The secondary-cell communication units are preferably relatively simple remote radio units in a distributed radio base system, where each remote radio unit forms a distributed radio base station together with the central main unit. Hence, each distributed radio base station has radio transceiver functionality divided between a remote radio unit and the central main unit. The primary-cell communication unit is typically provided either as a hard-wired remote radio unit or a complete radio base station. In general, there may be several primary-cell communication units with associated secondary-cell communication units. In practice, it may be beneficial to reuse existing radio base station sites for the primary-cell communication units and distribute only a minimum number of remote secondary-cell radio units to provide adequate cell density.

In order to maintain the reliability of the cellular communication system even at severe atmospheric conditions, the idea according to the invention is to monitor the wireless optical link quality and re-direct radio traffic within the communication system in case of insufficient link quality or link failures. By measuring the wireless optical link quality and re-directing the radio traffic from a secondary-cell communication unit with insufficient link quality to another fully connected communication unit, high and stable network availability can be guaranteed at all times on behalf of a somewhat reduced capacity in case of severe atmospheric conditions.

It is normally necessary to increase the radio coverage of the communication unit to which the radio traffic is to be re-directed before a handover is initiated. This means that the limited availability of a wireless optical link is generally compensated for by an increase in radio coverage of another fully connected communication unit. However, if another communication unit already covers the relevant area of the affected secondary cell, for example in a cellular architecture based on micro and macro cells, handover can be effectuated without increasing the radio coverage.

The communication unit to which the radio traffic is re-directed is naturally located in the neighborhood of the secondary-cell communication unit with insufficient wireless optical link quality and may be any radio-based communication unit capable of taking over the radio traffic.

In case of severe atmospheric conditions over a larger area of the communication system, disabling virtually all secondary-cell communication units, the primary-cell communication units will be able to increase their radio coverage, if necessary, and take over the radio traffic of the secondary-cell communication units. In this way, critical quality measures such as blocking frequency and number of lost calls may be preserved even though most or all of the wireless optical links are down. Naturally, the capacity will be somewhat reduced when the wireless optical links are down, but experiments show that the down-periods are relatively short, typically 0.001% to 1% of the total time, depending on link distance and location. Thus, the impact of the reduced capacity will be quite limited, while a high network availability is maintained.

If optical fibers are easily deployed from the primary-cell communication unit to the central main unit, it has turned out to be beneficial to provide at least one dedicated optical fiber (a pair of dedicated fibers is preferably used for duplex communication) between the primary-cell unit and the main unit for each wireless optical link. This means that a plurality of remote secondary-cell radio units can be distributed without being limited to multiplexing techniques such as time division multiplexing and optical wavelength multiplexing (which typically also requires wavelength filtering). This also enables simple, inexpensive and directly modulated optical transceivers in which the wavelength stability is not critical.

In another embodiment of the invention, which is particularly applicable in a micro-macro cell architecture, the link quality measurement and analysis is preferably implemented in the secondary-cell communication units. This means that the secondary-cell communication units, typically micro-cell units, themselves are capable of detecting when the signal quality is too low so that they can take appropriate actions accordingly. In particular, the fading rate of a wireless optical signal on the corresponding wireless optical link may be determined in a secondary-cell communication unit, and handover may be initiated either locally in the secondary-cell communication unit or centrally in the central main unit depending on the determined fading rate. This is particularly useful when the wireless optical link quality drops suddenly, making sure that handover is still properly effectuated by locally initiating the handover.

The invention offers the following advantages:
The benefits of using wireless optical links in cellular communication systems can be fully utilized without discriminating the reliability;
Cost-effective, rapid and robust implementation of dense-cell mobile networks with high capacity;
High and stable network availability,
No additional back-up equipment for point-to-point communication.
Rapid deployment;
No licensing is required for the wireless optical links;
No need for wavelength multiplexing and wavelength filtering techniques; and
Simple and inexpensive optical transceivers can be used.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
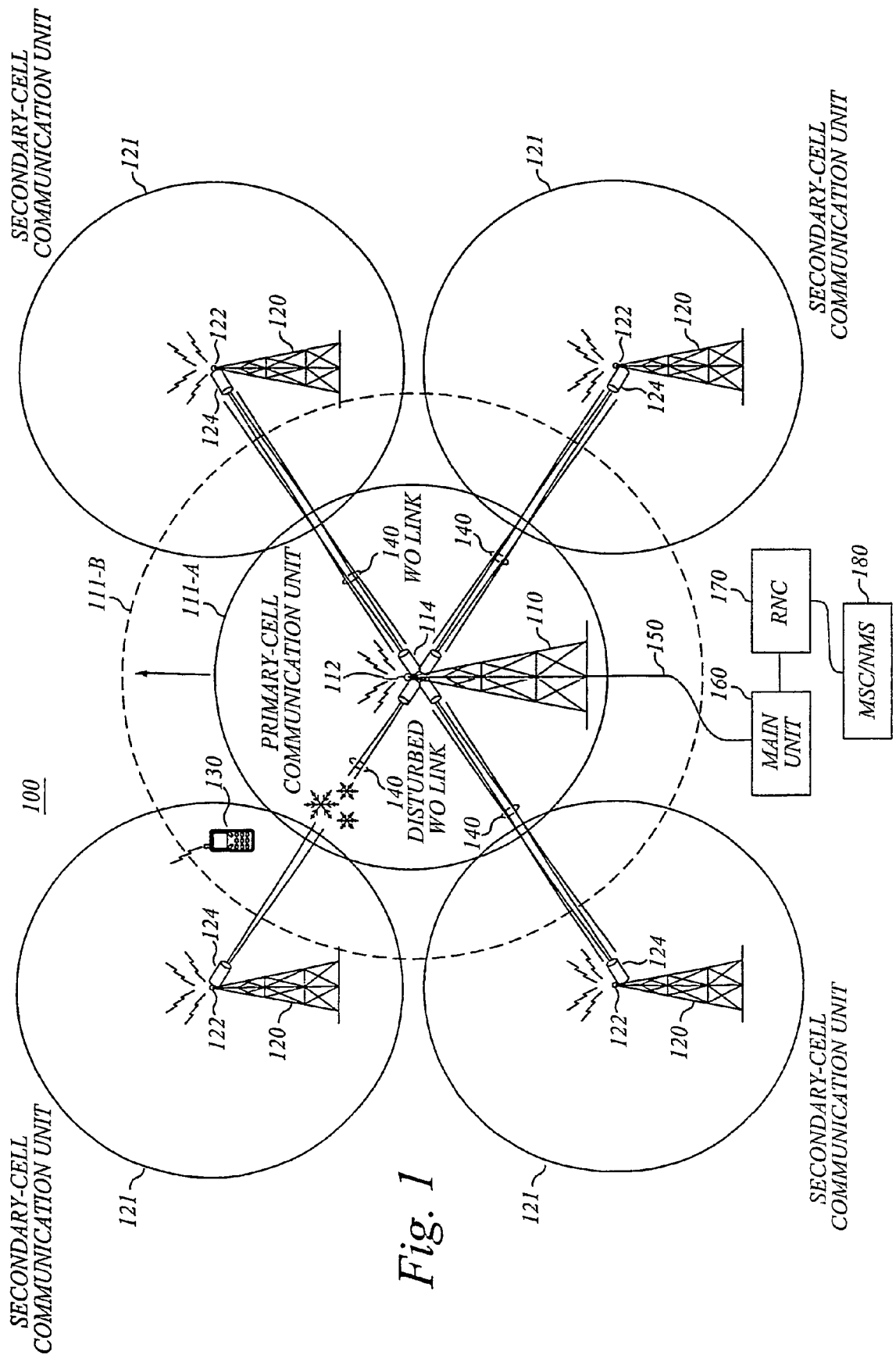
FIG. 1 is a schematic diagram illustrating relevant parts of a cellular communication system according to a preferred embodiment of the invention.

Throughout the drawings, the same reference characters will be used for corresponding or similar elements.

System Overview

FIG. 1 is a schematic diagram illustrating relevant parts of a cellular communication system according to a preferred embodiment of the invention. The cellular communication system 100 may be a mobile network or similar communication network. The cellular communication system 100 includes radio-based communication units, such as the primary-cell communication unit 110 and the secondary-cell communication units 120, for allowing radio communication with mobile radio terminals 130. Each radio-based communication unit generally serves a particular cell in the cellular system. The secondary-cell communication units 120 are interconnected to the primary-cell communication unit 110 via respective wireless optical (WO) links 140, and the primary-cell communication unit 110 in turn is interconnected by a link interface 150 to a central main unit 160. The main unit 160 is normally interconnected to a radio network controller (RNC) 170, which is sometimes referred to as a base station controller (BSC). This unit, possibly together with other RNCs, is typically connected to a mobile switching center (MSC) 180 having an associated network management system (NMS). In general, each RNC in the communication system is capable of handling several main units, and each main unit is capable of serving several primary-cell units. In some situations, the main unit 160 and the RNC 170 may be co-located and even integrated into the same physical unit.

Although the primary-cell communication unit of FIG. 1 is illustrated as having four interconnected secondary-cell communication units, it should be understood that the actual number and location of the secondary-cell communication units depend on factors such as desired cell density and antenna configuration.

Preferably, the primary-cell communication unit 110 and the secondary-cell communication units 120 are provided as simple remote radio units to enable rapid, low-cost configuration of a dense-cell communication network. The primary-cell communication unit 110 generally comprises at least one radio frequency (RF) transceiver 112 for radio communication with mobile terminals 130, as well as a number of optical transceivers 114 for optical communication with the secondary-cell communication units 120. The RF transceiver 112 generally provides full RF coverage throughout the primary cell 111-A. Each one of the secondary-cell communication units 120 includes at least one RF transceiver 122 and an optical transceiver 124. The RF transceiver 122 generally provides full RF coverage throughout the respective secondary cell 121.

In the main-remote concept, the system designer may distribute the radio base station functionality between the main unit side and the remote unit side in different ways and the actual implementation has to be decided from case to case. This means that the remote units may be implemented as radio units with varying functionality, ranging from simple radio heads towards more complex radio units. Providing the remote units as simple radio heads naturally leads to a more cost-effective implementation of the network if a large number of remote units are deployed. However, in some cases, it may be beneficial to provide the primary-cell communication unit 110 as a complete radio base station, for example if an existing radio base station site can be reused.

In a preferred embodiment, the main unit 160 includes functionality for link quality analysis and for controlling the remote units as well as conventional transceiver functions.

Free-space Optics

By employing wireless optical links, hard-wired connections between the primary-cell communication unit and the remote secondary-cell radio units are avoided and the remote radio units can thus be rapidly deployed and taken into operation in a cost-effective manner. The free-space optical technology provides data rates comparable to those attained in optical fibers, i.e. in the order of several Gbps (Gigabits per second) or more. In experimental settings, data rates of up to 160 Gbps/link have been demonstrated over wireless optical links. Competitive technologies such as optical fibers, copper cables and microwave links all have disadvantages that make them more or less unsuitable in distributed radio base stations with small, low-complexity radio heads. The main problem of using optical fibers between the primary cell and the secondary cells is the cost of installing the fiber infrastructure, including trenching, opening up streets and right-of-way negotiations. Even if dark fiber exists, the cost for renting fiber is often considerable. Copper cables can generally not provide enough capacity. Twisted pair xDSL (x Digital Subscriber Line) are limited to ~53 Mbps (Megabits per second). The capacity over a cable TV line is typically up to 27 Mbps on the download path, with a capacity of about 2.5 Mbps for responses in the other direction. This is not sufficient for interfaces in distributed radio base stations, which will generally require capacities in the order of Gbps. Microwave technology is a fairly equal competitor to the free-space optical technology in that it provides high availability, rapid deployment and good coverage. The main drawback of standard microwave links, however, is the limited capacity. Standard commercial microwave links of today have capacities of about 155 Mbps. This is not compliant with interfaces of distributed radio base stations, as mentioned above.

Although free-space optics has many advantages compared to the competitive technologies, a major obstacle is still the availability, as discussed in the background section. If a wireless optical link 140 is disturbed because of snow, fog or any other adverse atmospheric condition, the optical communication between the corresponding secondary-cell communication unit 120 and the primary-cell communication unit 110 and further on to the main unit 160 will be disrupted. This means that a mobile terminal 130 located in the affected secondary cell will be effectively isolated, since the radio traffic from the mobile unit only reaches the RF transceiver 122 of the corresponding secondary-cell communication unit 120. Radio traffic intended for the mobile terminal 130 will be stopped at the primary-cell communication unit 110.

Monitoring the Link Quality and Providing Adequate Radio Coverage

Instead of focusing on the link availability, trying to use more penetrating frequencies, optical amplification or microwave back-up, the dynamic mechanism according to the invention monitors the wireless optical link quality and compensates for insufficient link availability by providing adequate radio coverage from another radio-based communication unit within the cellular system and re-directing the radio traffic to that communication unit.

The quality of at least one, preferably all, of the wireless optical links 140 is continuously monitored in order to keep track of variations in the wireless optical link quality. Link quality measures such as signal strength, signal-to-noise ratio and/or error rates at different levels of the protocol stack are measured and analyzed in order to quickly detect a drop in the link quality so that appropriate actions can be taken. There is a variety of techniques for analyzing the quality of the optical signals transmitted over the wireless links. For example, if the received signal strength intensity (RSSI) is measured, a warning signal may be generated as soon as the minimum RSSI value drops below a certain threshold value. The selected threshold value is generally not a critical threshold for the availability of the link, but rather indicates that if the downward tendency continues for a couple of more minutes, communication over the link will not be possible. This gives the control system enough time to take appropriate actions for re-directing the radio traffic. It is also possible to analyze the difference between the maximum RSSI value and the minimum RSSI value during predetermined intervals, usually in the order of seconds. A large difference may be an indication of turbulence or other atmospheric problems affecting the wireless optical link.

If the quality of a wireless optical link 140 associated with a secondary-cell communication unit 120 is deemed to be insufficient for reliable communication over the link, radio traffic associated with a mobile terminal 130 located in the affected secondary cell 121 will be re-directed to another communication unit with adequate radio coverage. As illustrated in FIG. 1, this may be accomplished by increasing the output power of the RF transceiver 112 of the primary-cell communication unit 110 to increase the radio coverage of the communication unit from the initial area 111-A to the larger area 111-B, and making a handover, also referred to as a handoff, from the affected secondary-cell communication unit 120 to the primary-cell communication unit 110. Since the primary-cell communication unit 110 is hard-wired or otherwise reliably linked to the main unit 160, the radio traffic can be communicated between the mobile terminal 130 and the mobile switching center (MSC) 180 without having to rely on the wireless optical links. In this way, the blocking probability and the number of dropped calls can be preserved on behalf of the bit-rate. The increased radio coverage will naturally lead to reduced capacity, but this will not affect services that only require a limited data rate, e.g. speech channels. In addition, the down periods of the wireless optical links are typically relatively short, say 0.1% of the total time, and hence the effect of the limited capacity is quite acceptable.

The analysis of the link quality is preferably implemented in the main unit 160 in order to keep the complexity of the remote units 110, 120 as low as possible. This normally requires that the link quality measurements are made by the primary-cell communication unit 110 and communicated to the main unit 160 for analysis, or that the optical signals transmitted over the wireless optical links 140 are forwarded by fiber optics 150 to the main unit 160 for link quality measurements and subsequent analysis, as will be described with reference to FIG. 5. In some cases, it may however be appropriate to measure and analyze the link quality in the remote secondary-cell units 120, as will be described later on. Anyway, the link quality measurements may be implemented by using any conventional or future circuitry for measuring link quality.

In a typical implementation, several primary-cell communication units with associated secondary-cell communication units, and possibly also other types of radio-based communication units are connected to the main unit 160. This means that several communication units in the neighborhood of a secondary-cell communication unit with insufficient wireless optical link quality may be capable of providing adequate radio coverage for the mobile terminal 130. The communication unit to which the radio traffic is re-directed may be another neighboring primary-cell communication unit, which is not directly associated with the affected secondary-cell communication unit or another secondary-cell communication unit with an available wireless optical link. The communication unit that takes over the radio traffic may even be a macro-cell communication unit as will be described below with reference to FIG. 2.

As pointed out above, it is normally necessary to increase the radio coverage of the communication unit to which the radio traffic is to be re-directed before a handover is initiated. This means that the limited availability of a wireless optical link is generally compensated for by increasing the radio coverage of another fully connected communication unit. However, if the radio coverage of another communication unit already covers the relevant area of the affected secondary cell, for example in a micro-macro cell architecture, the handover can be effectuated without increasing the radio coverage.

Implementation in a Micro-macro Cell Architecture

Figure 2:
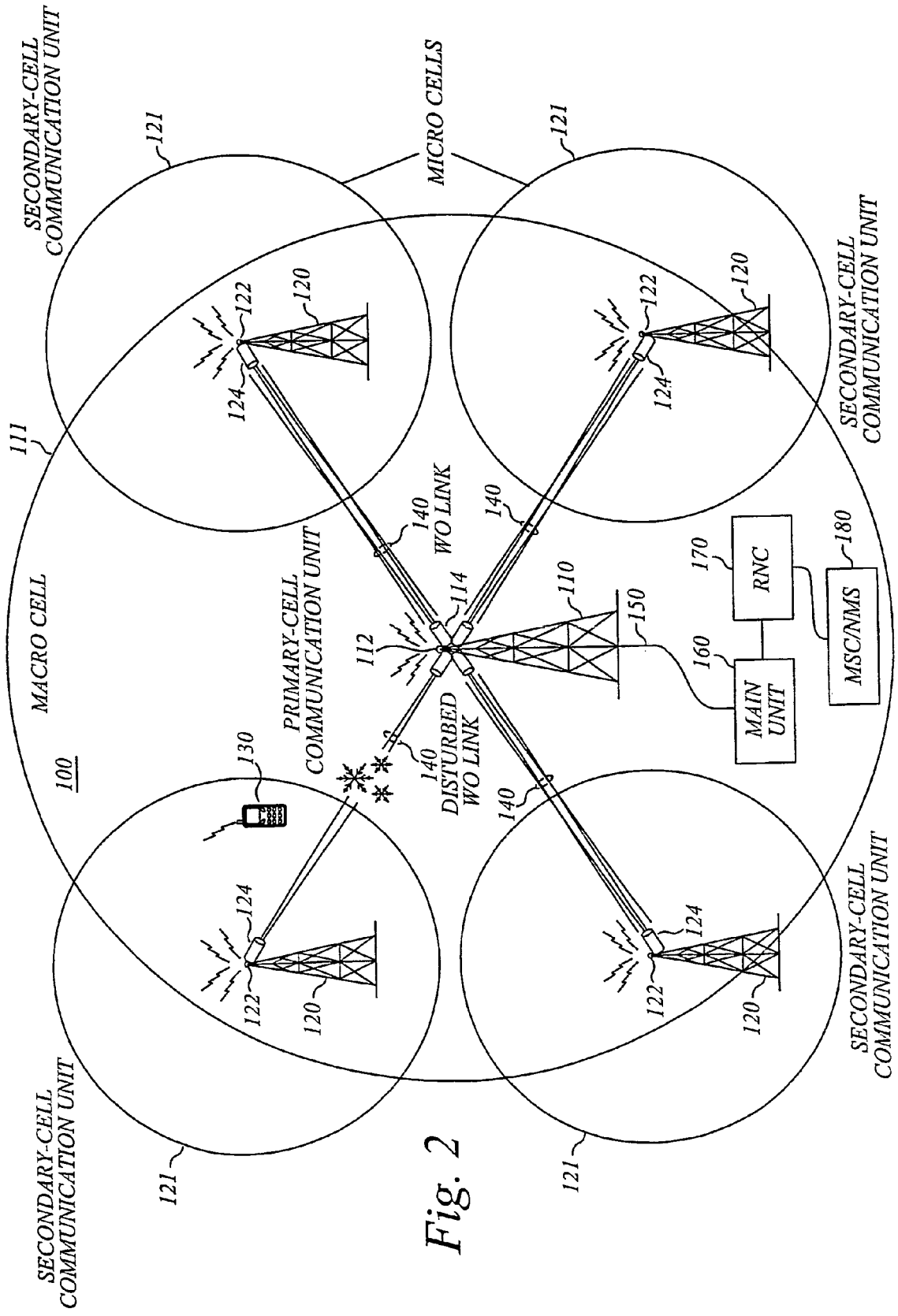
FIG. 2 is a schematic diagram illustrating relevant parts of a cellular communication system according to another preferred embodiment of the invention.

FIG. 2 illustrates relevant parts of a cellular communication system according to another preferred embodiment of the invention implemented in a micro-macro cell architecture. The communication system of FIG. 2 is similar to that of FIG. 1, except for the cell architecture. In FIG. 2, the primary-cell communication unit 110 serves a macro cell 111, whereas the secondary-cell communication units 120 serve respective micro cells 121. This means that if a wireless optical link 140 between a secondary-cell communication unit 120 and the primary-cell communication unit 110 is disturbed, the mobile terminal 130 in the relevant micro cell 121 may be handed over directly to the primary-cell communication unit 110, which has a radio coverage throughout the macro cell 111.

In the case of a system using Code Division Multiple Access (CDMA), the macro-cell unit may preserve its RF output power, while still maintaining at least one speech channel for each user within the macro cell. This generally means that the capacity on the up link and down link for each user will be reduced. If the macro-cell unit increases its RF output power, the capacity can be increased, but there will generally be a difference in available data rate between the up link and the down link with a slightly higher capacity on the down link. This is normally acceptable as long as there is sufficient capacity for at least one speech channel on the up link.

In a micro-macro cell architecture, it may also be advantageous to measure and analyze the wireless optical link quality in the secondary-cell communication units 120, as further discussed below. This means that each secondary-cell communication unit 120 may detect when the signal quality is too low, and take appropriate actions in response thereto.

Exemplary Flow Diagrams

For a better understanding of the invention, preferred embodiments of the invention will now be described in more detail with reference to the exemplary flow diagrams of FIGS. 3 and 4.

Figure 3:
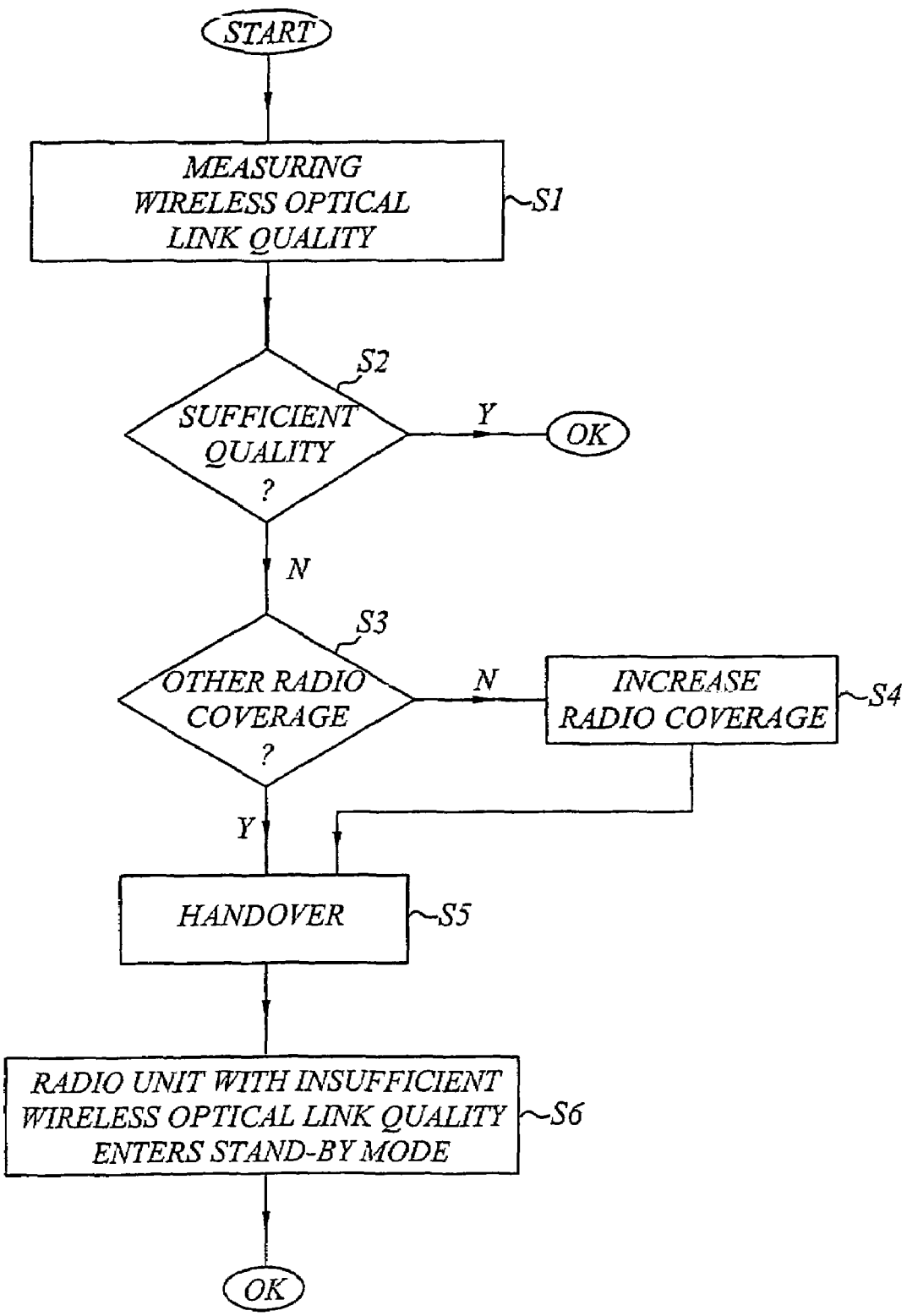
FIG. 3 is a schematic flow diagram illustrating a method of operating a cellular communication system according to a preferred embodiment of the invention.

FIG. 3 is a schematic flow diagram illustrating a method of operating a cellular communication system according to a preferred embodiment of the invention. The wireless optical link quality is measured more or less continuously, as represented by step S1. The link quality is analyzed in step S2. Preferably, the analysis is executed in the central main unit, which communicates with the network management system (NMS). If the link quality is sufficient (Y), the wireless optical links are employed for communication between the primary-cell unit and the respective secondary-cell units. On the other hand, if the analysis reveals that the quality of a wireless optical link is insufficient (N), a warning is sent to the NMS, or the RNC (depending on the control system hierarchy used). In step S3, the NMS checks whether there is any alternative radio coverage for the mobile terminals within the affected secondary cell. If no alternative radio coverage exists (N) the NMS demands, via the central main unit, one or more remote primary-cell radio units or any other suitable communication units in the neighborhood to increase the radio coverage (step S4). The NMS removes the unavailable secondary-cell unit from a central list of available radio units, and sends the updated list back to the mobile terminal or terminals in the affected secondary cell. These actions must be completed while the wireless optical link quality is still sufficient for communication. Experiments show that the link quality does not normally drop suddenly, allowing the necessary communication between the NMS and the mobile terminals. Based on the updated list, the mobile terminal appreciates that the secondary-cell unit to which it is connected no longer is available and makes a handover to the communication unit from which the strongest radio signal is received (step S5). If adequate radio coverage is already provided by another communication unit, such as a macro cell unit, a handover (S5) can be performed immediately without increasing the radio coverage. In step S6, the secondary-cell unit with poor link quality is typically instructed to enter radio stand-by mode, in which it reduces the RF output power and only listens to the main unit or NMS for further instructions. The reduction of the RF output power is not compulsory, but highly desirable in order to reduce the noise level in the network. In stand-by mode, the secondary-cell unit transmits an optical test signal over the wireless optical link. The quality of the transmitted optical test signal is analyzed in the usual manner in the central main unit to detect when the wireless optical link quality is sufficient for communication again. Once the wireless optical link is deemed to be operational again, the NMS updates the list of available radio units, instructs the secondary-cell unit to enter normal radio mode, in which the RF output power is increased, and also instructs the communication unit to which the radio traffic was handed over to reduce its RF output power to normal again.

In another embodiment of the invention, which is particularly applicable in a micro-macro cell architecture, the link quality measurement and analysis is preferably implemented in the secondary-cell communication units. This means that the secondary-cell communication units, typically micro-cell units, themselves are capable of detecting when the signal quality is too low so that they can take appropriate actions accordingly. In particular, the fading rate of a wireless optical signal on the corresponding wireless optical link may be determined in a secondary-cell communication unit, and then handover may be initiated either locally in the secondary-cell communication unit or centrally in the central main unit depending on the determined fading rate, as exemplified below with reference to a micro-macro cell architecture.

Figure 4:
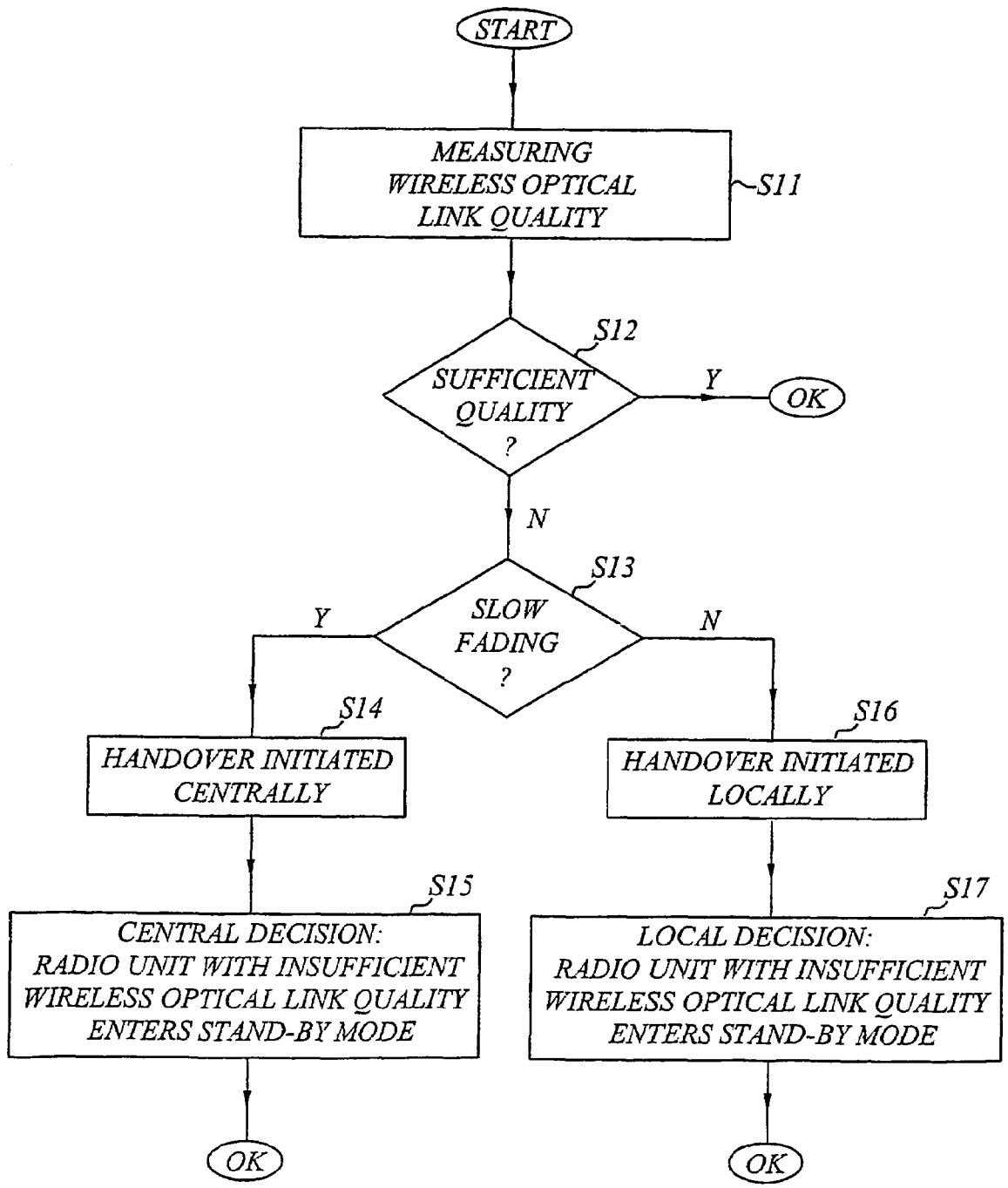
FIG. 4 is a schematic flow diagram illustrating an exemplary method of operating a cellular communication system.

FIG. 4 is a schematic flow diagram illustrating an exemplary method of operating a cellular communication system. The wireless optical link quality is measured in one or more, preferably each, of the micro-cell units, as represented by step S11. In step S12, the link quality is analyzed locally in one or more, preferably each, of the secondary micro-cell units. If the link quality of a wireless optical link is sufficient (Y), the link is employed for communication between the primary macro-cell unit and the corresponding secondary micro-cell unit. On the other hand, if the local analysis indicates that the quality of a wireless optical link associated with a secondary micro-cell unit is insufficient (N), the micro-cell unit attempts to send a warning to the main unit and possibly further on to the associated network management system (NMS). In step S13, it is further determined whether the wireless optical signal fades away slowly or fast, i.e. whether there will be any reliable contact between the mobile terminals located in the relevant micro cell and the main unit or the NMS within the next few minutes.

If the link quality analysis indicates that the wireless optical signal fades away slowly (Y), i.e. the fading rate is lower than a given threshold, the handover will be initiated centrally from the NMS (step S14). The NMS simply removes the micro-cell unit from the list of available radio units and sends the updated list to the mobile terminal, which then makes a handover to the macro-cell unit. In step S15, the secondary-cell unit with insufficient link quality is typically instructed to enter radio stand-by mode. In this case, an optical test signal is preferably transmitted over the wireless optical link from the primary-cell unit to the secondary-cell unit. The test signal is analyzed in the secondary-cell unit during stand-by mode in order to detect when the link quality of the wireless optical link is sufficient again. When the wireless optical link is deemed to be operational, the secondary-cell unit enters normal radio mode and the list of available radio units will be updated to enable handover to the secondary-cell unit.

If the link quality analysis indicates that the wireless optical signal fades away fast (N), i.e. the fading rate is higher than a given threshold, the handover will be initiated locally from the relevant micro-cell unit (step S16). Since the link quality analysis is performed locally, the micro-cell unit knows that the optical signal is lost or will be lost within short, and does not have to wait for the NMS response. The micro-cell unit thus enters radio stand-by mode although the NMS has not yet responded (step S17). In this case, the reduction of the RF output power in stand-by mode is a strict requirement that must be fulfilled since it is not possible to rely on the NMS and the central mechanism of updating the list of available radio units. Instead, the mobile terminal or terminals within the affected micro cell detect that the received radio signal intensity from the primary macro-cell unit is stronger than that from the micro-cell unit in stand-by mode, and consequently makes a handover to the primary macro-cell unit. As before, the analysis of a test signal transmitted by the primary-cell unit over the wireless optical link is performed in the secondary-cell unit during stand-by mode.

It should be understood that other ways of re-directing the radio traffic to another communication unit are possible as well. In fact any conventional mechanism for effectuating a handover, including mobile-assisted handover and centrally forced handover, can be adapted for use by the invention.

The Link Interface Between the Primary-cell Unit and the Main Unit

With reference once again to FIGS. 1 and 2, the link 150 between the primary-cell unit 110 and the main unit 160 is preferably based on optical fiber. For network availability reasons, the connection between the primary-cell unit and the main unit should not be based on free-space opto technology. Although copper cables and microwave links are not excluded, the use optical fiber between the primary-cell unit and the main unit is currently the best solution, especially if the capacity requirements are high. The use of optical fibers makes it possible to locate the main unit several tens of kilometers away from the primary-cell unit and its associated secondary-cell units.

The fact that the wavelengths used in fiber optics fall within atmospheric transmission windows enables wireless optical links of up to 500 meters using directly modulated standard transceivers, simple optics and no additional optical amplification. In this way, low-cost links between the primary-cell unit and the secondary-cell units can be realized. In addition, capacities of up to several Gbps can be obtained using directly modulated lasers, and the same light can be used for free-space hops and fiber transmission without any intermediate optical-electro-optical conversion. This is fully compliant with third generation (3G) communication systems, in which the typical cell size in urbanized areas is a few hundred meters.

It should though be understood that the wireless optical links are not limited to wavelengths that are compatible with those used in fiber optics. Any wavelength that falls within an atmospheric transmission window is applicable, provided that suitable conversion is performed between the fiber and the wireless optical links.

Multi-fiber Configuration

If optical fibers are easily deployed between the primary-cell unit and the main unit, it has turned out to be beneficial to provide at least one dedicated optical fiber between the primary-cell unit and the main unit for each wireless optical link. This so-called multi-fiber configuration is potentially cost-effective since no wavelength multiplexing and wavelength filtering techniques are required.

Figure 5:
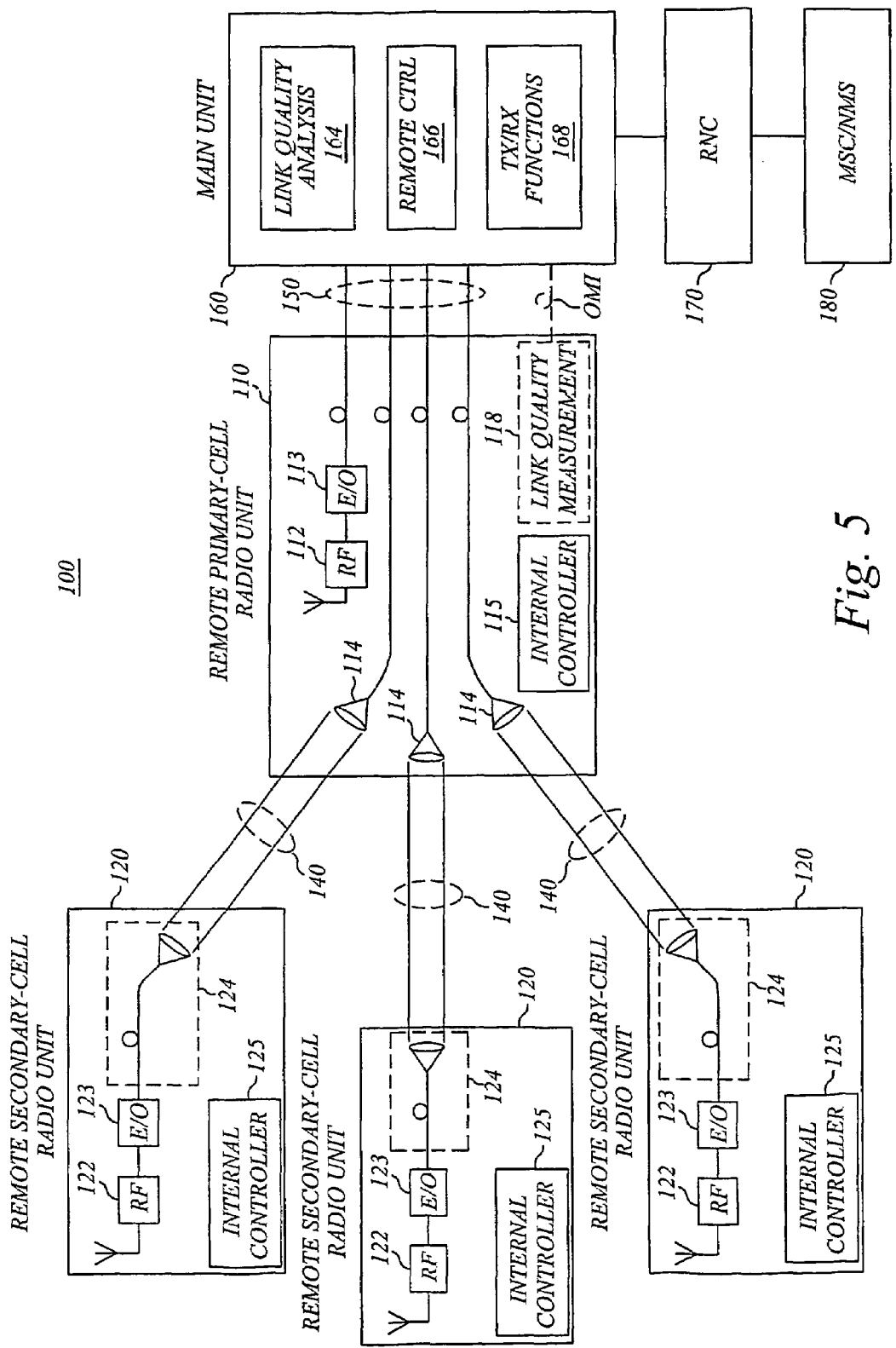
FIG. 5 is a schematic block diagram illustrating an exemplary implementation of a cellular communication system with a main unit connected to distributed remote radio units by means of a multi-fiber configuration in combination with wireless optical links.

FIG. 5 is a schematic block diagram illustrating an exemplary implementation of a cellular communication system with a main unit connected to distributed radio units by means of a multi-fiber configuration in combination with wireless optical links. The communication system 100 includes remote radio units such as the remote primary-cell radio unit 110 and the remote secondary-cell radio units 120. As before, the secondary-cell units 120 are interconnected to the primary-cell unit 110 via respective wireless optical links 140. The primary-cell communication unit 110 is now interconnected to the main unit 160 via multiple optical fibers, which together form the link interface 150. The main unit 160 is normally interconnected to a radio network controller (RNC) 170, which in turn is connected to a mobile switching center (MSC) 180 having an associated network management system (NMS).

The information flow will mainly be described in the direction from the secondary-cell units 120 to the primary-cell unit 110 and further on to the main unit 160. Traffic in the opposite direction is analogous, and it should be understood that the invention supports bi-directional, full-duplex communication. For duplex communication, a dedicated pair of optical fibers is normally used for each wireless optical link, although it is possible to have duplex communication over a single optical fiber.

Conveniently, each remote secondary-cell radio unit 120 includes an antenna-connected RF transceiver 122, which is coupled via an electro-optical interface 123 to an optical transceiver 124. The secondary-cell unit 120 is typically provided with some form of internal controller 125 for performing various control functions such as initiating the transmission of the optical test signal and controlling the RF output power. The optical transceiver 124 may simply be configured as a piece of optical fiber connected to collimating/receiving optics. There are two reasons for using an optical fiber before entering the collimating optics. First of all, it allows the collimating optics to be located in any suitable position, which can be quite far away from the RF transceiver. Secondly, the emitted wave front from the optical transceiver element is generally not symmetric, whereas the output from the fiber is approximately Gaussian and symmetric. This makes it possible to use standard low-cost optical components for collimation. In this particular example, the collimating optics is based on a lens (with or without anti-reflex coating) or a (mirror-based) telescope.

The collimated optical signal from the optical transceiver 124 of a given secondary-cell unit 120 is transmitted through the atmosphere (wireless optical link 140) to a respective optical transceiver 114 in the primary-cell unit 110. The primary-cell unit 110 preferably includes several such optical transceivers 114, one for each secondary-cell unit 120 to which it is interconnected. Preferably, each optical transceiver 114 is also based on standard low-cost receiving/collimating optics such as a lens or a telescope. The receiving lens focuses the incoming optical signal into a dedicated optical fiber of the multi-fiber link interface 150 and transfers the optical signal to the main unit 160. This kind of implementation requires only a minimum amount of active optical components, and since each remote unit has its own dedicated optical fiber (or pair of fibers) in the multi-fiber link interface, no wavelength multiplexing or other type of multiplexing is necessary. This means that the requirements on wavelength stability will not be critical.

Of course, the invention includes the possibility to use optical amplification if longer free-space hop-lengths are required. Using optical amplification, hop lengths in the order of kilometers are possible, depending on local weather conditions.

The remote primary-cell radio unit 110 also includes an RF transceiver 112, which is connected via an electro-optical interface 113 to one of the optical fibers of the multi-fiber interface 150 for connection with the main unit 160. The primary-cell radio unit 110 furthermore includes an internal controller 115 for performing various control functions such as controlling the output power of the RF transceiver 112, preferably in response to control commands from the main unit 160.

The main unit 160 typically includes a link quality analysis unit 164, a remote control unit 166 as well as transceiver functions 168.

The link quality analysis unit 164 is preferably implemented as an opto-electronic decision circuit (OEDC). In this particular example, the link quality analysis unit 164 also comprises equipment for the actual link quality measurements. The equipment for measuring the link quality generally probes the optical signals transmitted over the wireless optical links 140 as forwarded by the optical fibers 150, and performs measurements on the optical signals. In the OEDC, the signal quality is analyzed electronically in terms of signal strength, signal-to-noise ratio or error rates at different levels of the protocol stack.

Alternatively, the link quality measurements are performed in the primary-cell unit 110 and communicated to the main unit 160 for analysis. In this case, the primary-cell communication unit 110 is provided with equipment 118 for link quality measurements. The link quality information obtained by the measurement equipment 118 is generally transmitted over a separate optical control channel, also referred to as an Optical Management Interface (OMI), to the link quality analysis unit 164 for analysis by the OEDC.

If the OEDC finds that the quality of a wireless optical link is insufficient, a warning is sent to the NMS 180 or the RNC 170 (depending on the control system hierarchy). The NMS 180 or RNC 170 checks whether there is any alternative radio coverage for the mobile terminals within the affected secondary cell. If no alternative radio coverage exists, the NMS 180 or RNC 170 demands, via the remote control unit 166, the closest remote primary-cell radio unit or units to increase their radio output power. The unavailable secondary-cell unit is removed from a central list of available radio units stored in the NMS 180, and the updated list is sent back to the mobile terminal or terminals in the affected secondary cell so that handover can be initiated.

As indicated above, the network control functions, including allocation and release of radio channels, handover management as well as the dynamic radio coverage control, may be distributed between the main unit, RNC and the NMS in different ways, depending on the selected control system hierarchy.

It should also be understood that it is possible to implement the decision circuit using all-optical processing, without any opto-electronic conversion.

Wavelength Division Multiplexing (WDM)

If the number of pre-existing fiber is too small for realizing the multi-fiber configuration, or if it can not be economically motivated to install more fibers, an alternative scheme based on Wavelength Division Multiplexing (WDM) can be used. Course WDM may be advantageous for economical reasons, while dense WDM is also technically possible. The main difference compared to the multi-fiber configuration described above is that the incoming light includes well-separated and well-defined wavelengths. Each wavelength carries information from only one remote secondary-cell unit. The primary-cell unit also has its own wavelength. If a single fiber is used, the optical signals have to be multiplexed before entering the fiber between the primary-cell unit and the main unit and demultiplexed on the main unit side. Since multiplexing and demultiplexing of optical signals are quite tedious tasks and require well-defined wavelengths that must be stable over time, the WDM configuration requires advanced and rather complex optical components. This is generally contradictory to economical requirements, but may be justified if the cost for installing new fiber is high.

A WDM configuration also makes it possible for a single main unit to manage several primary-cell units with associated secondary-cell units. If the primary-cell units are located at different sites, the number of optical fibers will generally correspond to the number of primary-cell sites (or twice the number of primary-cell sites if fiber pairs are used for duplex communication). DWDM systems may well handle more than 100 different wavelengths. This means that a single main unit should be capable of handling more than 100 remote units, using a very reasonable number of optical fibers.

Radio Base Station Design with Respect to the Radio Transceiver Functionality

Figure 6A:
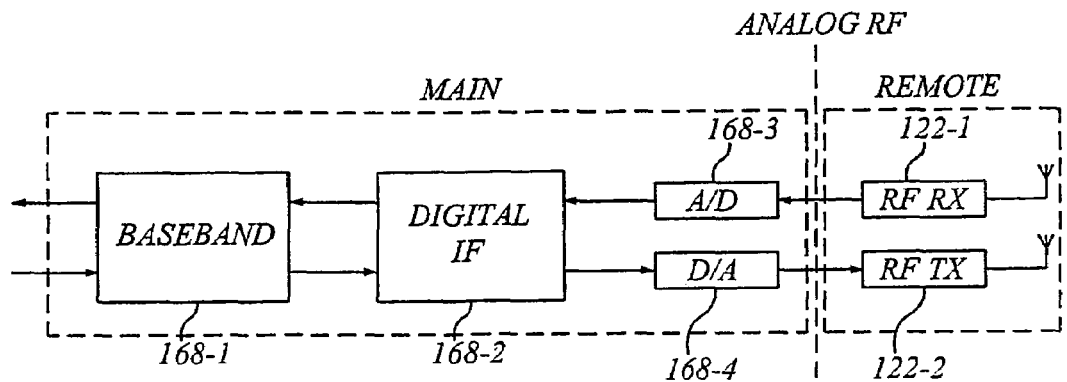
FIGS. 6A-C are schematic diagrams illustrating different variants of the main-remote interface with respect to the radio transceiver functionality.
Figure 6B:
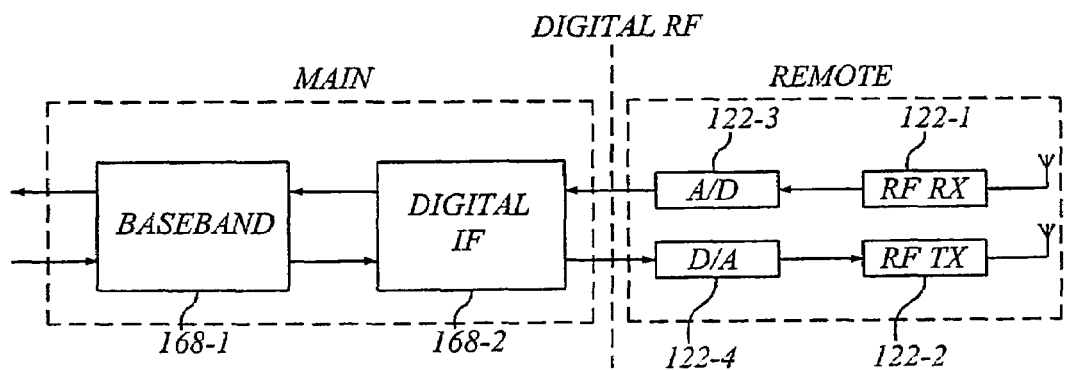
Figure 6C:
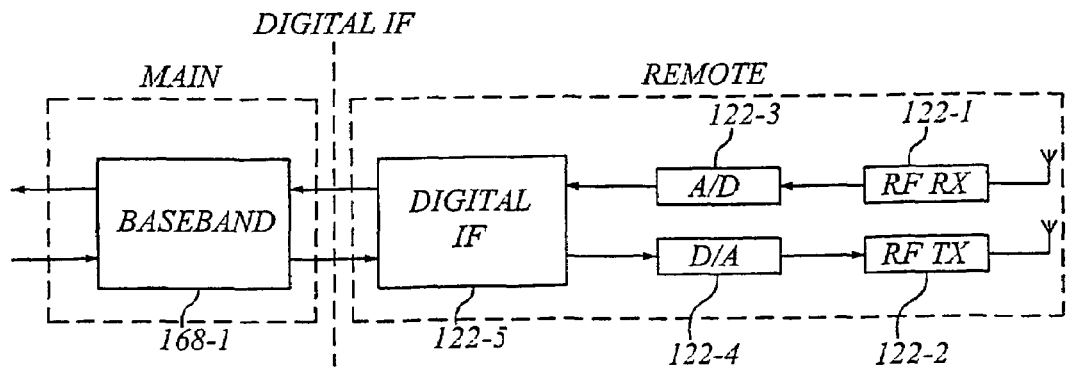

In the main-remote concept, the radio transceiver functionality may be divided between the main and remote unit in different ways. This gives the radio designer a certain degree of freedom with regard to the electronic complexity of the remote radio units. FIGS. 6A-C illustrate a few variants of the main-remote interface with respect to the radio transceiver functionality.

FIG. 6A illustrates the case of analog RF transmission between the main unit and the remote unit. In this example, most of the transceiver functionality of the distributed radio base station is located in the main unit. The transceiver functionality of the main unit includes a digital baseband processing unit 168-1, a digital intermediate frequency (IF) processing unit 168-2 as well as an analog-to-digital (A/D) converter 168-3 and a digital-to-analog (D/A) converter 168-4. The digital baseband processing unit 168-1 performs baseband processing and frequency conversion between the baseband and the intermediate frequency (IF) band. The digital IF processing unit 168-2 digitally processes radio signals at an intermediate frequency and performs frequency conversion between the intermediate frequency band and the radio frequency (RF) band. The A/D-converter 168-3 converts analog radio signals from an RF receiver 122-1 in the remote unit into digital form for transmission to the digital IF processing unit 168-2. The RF receiver 122-1 is connected to an antenna for receiving radio signals from mobile subscriber terminals. The D/A-converter 168-4 converts the digital RF signal from the digital IF processing unit 168-2 into analog form for transmission to an RF transmitter 122-2 in the remote unit. The RF transmitter 122-2 is connected to either the same or a different antenna for transmitting radio signals to mobile subscriber terminals. Apparently, the remote unit can be made very simple with respect to the transceiver functionality.

FIG. 6B illustrates the case of digital RF transmission between the main unit and the remote unit. In this example, the conversion between digital and analog radio signals is implemented on the remote side. This means that in addition to the RF receiver 122-1 and the RF transmitter 122-2, the remote unit now also includes an A/D-converter 122-3 and a D/A-converter 122-4.

FIG. 6C illustrates the case of digital IF transmission between the main unit and the remote unit. In this example, the digital IF processing is located on the remote side, with a digital IF processing unit 122-5 provided in the remote unit.

It is also possible to locate the digital baseband processing unit on the remote side, thus providing complete RF transceiver functionality in the remote unit. This is normally not the preferred implementation, since it is often beneficial to use remote units of low-complexity.

Network Planning

In the other end, on the network planning level, the network administrator has several options for providing full coverage by carefully distributing remote radio units over a given network area. In the following, two different architectures based on omnidirectional antennas and three-sector antennas, respectively, will be described.

Figure 7A:
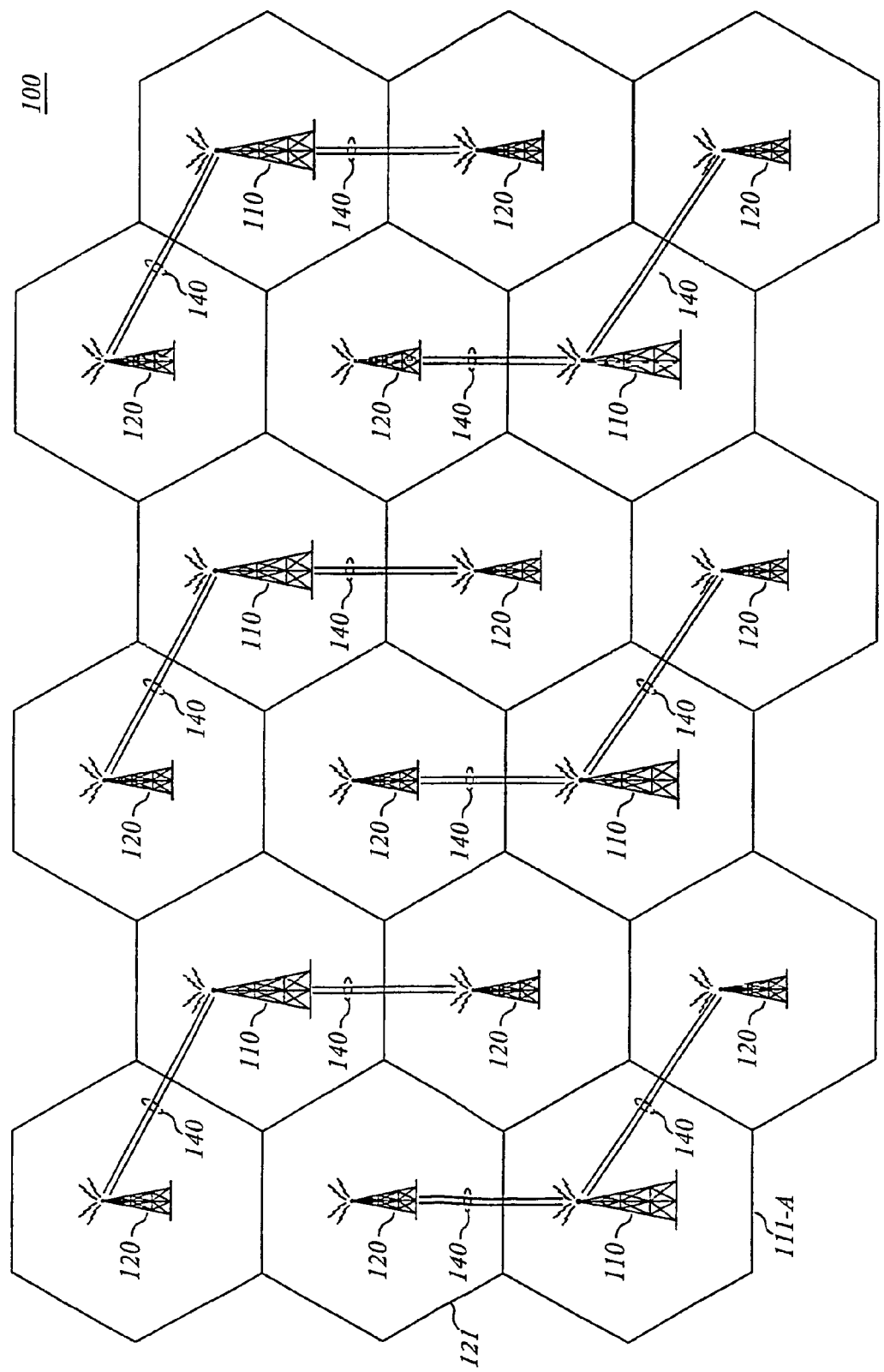
FIG. 7A is a schematic diagram of an exemplary cellular communication system according to the invention based on omnidirectional radio antennas.
Figure 7B:
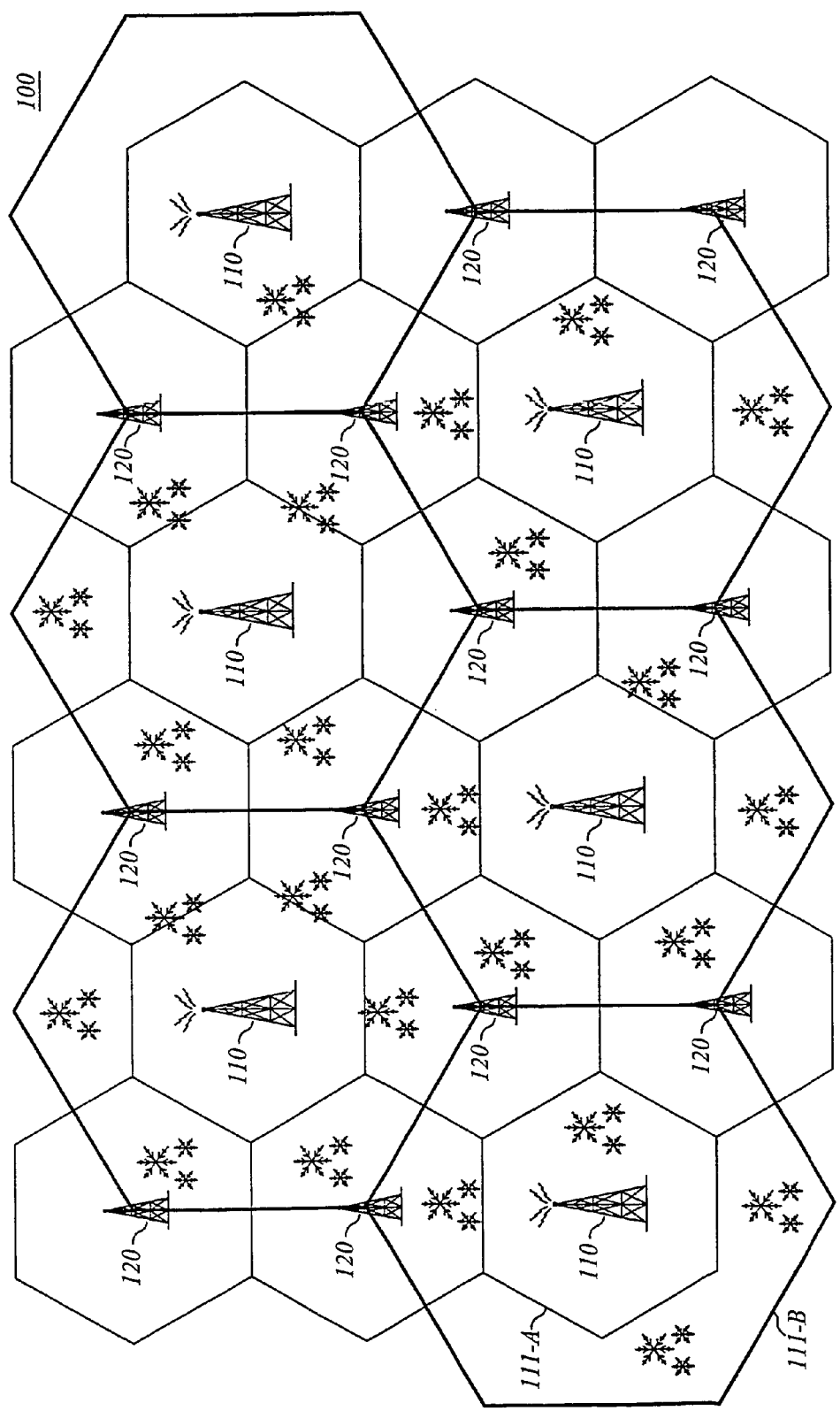
FIG. 7B is a schematic diagram of the cellular communication system of FIG. 7A in case of insufficient wireless optical link availability.

FIG. 7A is a schematic diagram of an exemplary cellular communication system according to the invention based on omnidirectional radio antennas in the remote radio units. In the case of using omnidirectional antennas, a configuration with two secondary-cell sites 120 for each primary-cell site 110 may be efficient. Each primary-cell site 110 is interconnected by respective wireless optical links 140 to two suitably located secondary-cell sites 120. For simplicity, the main unit and the associated radio network controller (RNC) and mobile switching center/network management system (MSC/NMS) are not shown in FIG. 7A. As long as the wireless optical links 140 are fully functional, the network availability will be high and stable, each remote site serving its respective cell 111-A, 121. However, if it starts snowing or fog begins to develop, the atmospheric conditions for the wireless optical links will deteriorate and the link availability will be reduced. Bad weather will often have an effect on a relatively large number of remote sites, and therefore the actions taken to compensate for the reduced link availability are normally related to several or all remote sites within a cellular communication network or subnetwork. If the secondary-cell sites 120 within the affected network area can not establish reliable wireless optical connections to the associated primary-cell sites 110, the primary-cell sites are instructed to increase their RF coverage to serve a larger area 111-B than the initial area 111-A, as illustrated in FIG. 7B. In this way, it is possible for the primary-cell sites 110 to fully cover the network area of interest by increasing the output power of their RF transceivers. The radio traffic associated with mobile terminals in the network is subsequently re-directed to the primary-cell sites by means of more or less conventional handover techniques. This means that full RF coverage can be guaranteed although the wireless optical links are down. Preferably, the secondary-cell sites 120 enter radio stand-by mode in order to reduce the noise level in the network.

Figure 8A:
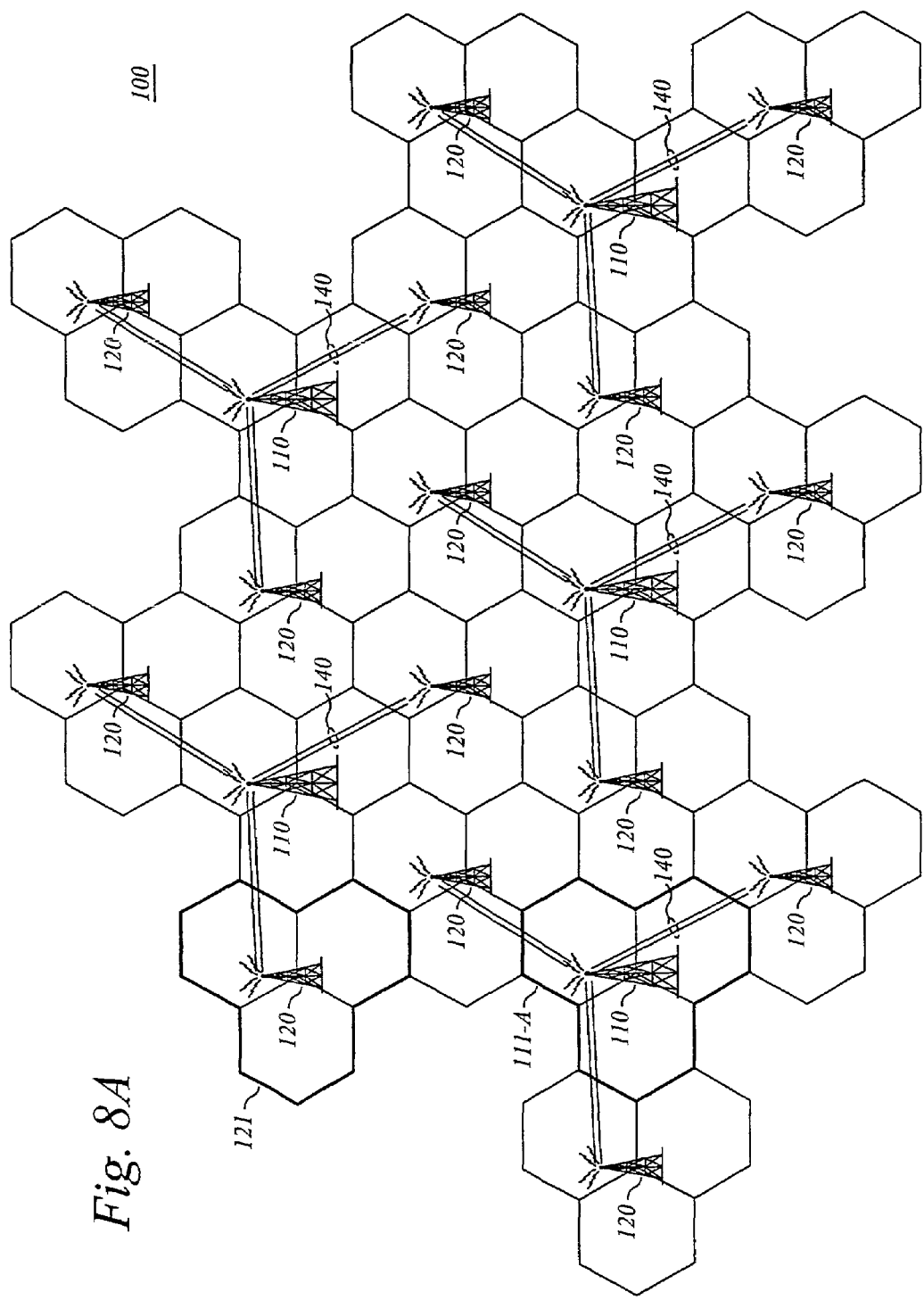
FIG. 8A is a schematic diagram of an exemplary cellular communication system according to the invention based on three-sector antennas.

FIG. 8A is a schematic diagram of an exemplary cellular communication system according to the invention based on three-sector antennas. Three-sector antennas are the most commonly used antennas in GSM and W-CDMA systems. For this type of antenna, a configuration with three secondary-cell sites 120 for each primary-cell site 110 is appropriate, as illustrated in FIG. 8A. Each primary-cell site 110, serving a primary cell 111-A, is interconnected by respective wireless optical links 140 to three suitably located secondary-cell sites 120, each serving a respective secondary cell 121.

Figure 8B:
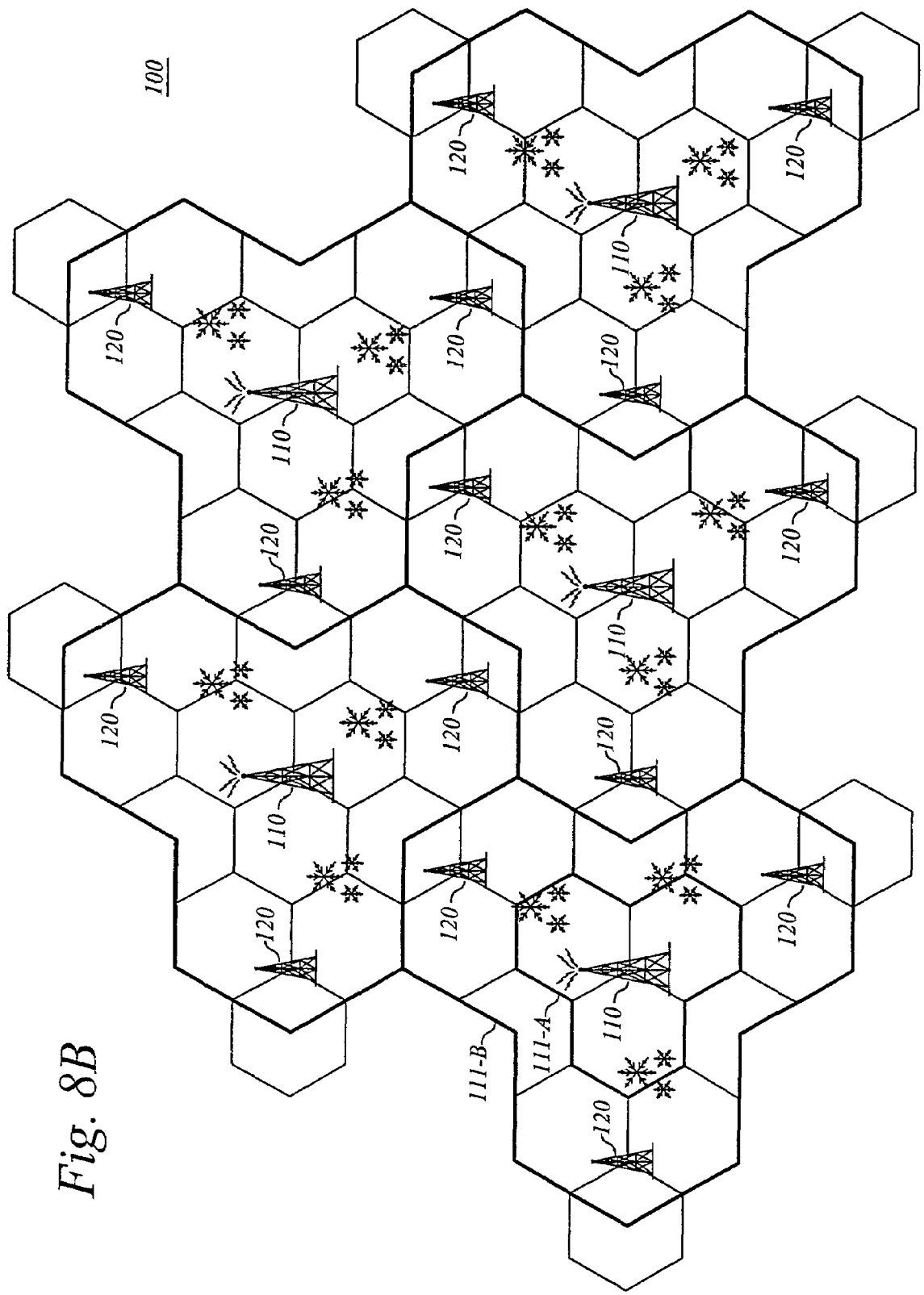
FIG. 8B is a schematic diagram of the cellular communication system of FIG. 8A in case of insufficient wireless optical link availability.

FIG. 8B is a schematic diagram of the cellular communication system of FIG. 8A in case of insufficient wireless optical link availability. The secondary-cell sites 120 preferably enter radio stand-by mode and the primary-cell sites 110 increase their RF coverage from initial area 111-A to the larger area 111-B to provide full RF coverage in the network.

Naturally, if the primary-cell sites are macro-cell sites providing adequate radio coverage from the beginning, it may not be necessary to increase the radio coverage. In such a case, the mobile terminals simply make a handover to the macro-cell sites.

The embodiments described above are merely given as examples, and it should be understood that the present invention is not limited thereto. Further modifications, changes and improvements which retain the basic underlying principles disclosed and claimed herein are within the scope and spirit of the invention.

The invention claimed is:

1. A cellular communication system based on a plurality of radio-based communication units, said communication system comprising:
   a central main communication unit;
   a primary-cell radio-based communication unit interconnected to said central main unit;
   a number of secondary-cell radio-based communication units, each of which is connected to said primary-cell radio-based communication unit via a respective wireless optical link and provided as a remote radio unit forming a distributed radio base station together with said central main unit, said distributed radio base station having radio transceiver functionality divided between said remote secondary-cell radio unit and said central main unit;
   means for measuring the quality of at least one of said wireless optical links;
   means for re-directing radio traffic, if the measured wireless optical link quality associated with a secondary-cell communication unit is insufficient, from the secondary-cell communication unit to another one of said communication units within said cellular communication system; and
   means for making a determination if radio coverage of the another one of said communication units covers an area where the wireless optical link quality associated with the secondary-cell communication unit is insufficient, and if the determination is negative for increasing the radio coverage of the another one of said communication units.

2. The cellular communication system according to claim 1, wherein said primary-cell communication unit is provided as a remote radio unit forming a distributed radio base station together with said central main unit.

3. The cellular communication system according to claim 1, wherein said primary-cell communication unit is a complete radio base station.

4. The cellular communication system according to claim 1, wherein the analysis of the measured wireless optical link quality is implemented in said central main unit.

5. The cellular communication system according to claim 4, wherein said means for measuring the link quality is implemented in said primary-cell communication unit or said central main unit.

6. The cellular communication system according to claim 1, wherein said primary-cell communication unit is interconnected to said central main unit by means of multiple hard-wired communication links, at least one dedicated communication link being assigned for each wireless optical link.

7. The cellular communication system according to claim 6, wherein each dedicated communication link is based on optical fiber.

8. The cellular communication system according to claim 1, wherein said re-directing means comprises means for causing handover from said secondary-cell communication unit with insufficient wireless optical link quality to said other communication unit.

9. The cellular communication system according to claim 8, further comprising means for causing said secondary-cell communication unit with insufficient wireless optical link quality to enter radio stand-by mode.

10. A cellular communication system based on a plurality of radio-based communication units, said communication system comprising:
    a central main communication unit;
    a primary-cell radio-based communication unit interconnected to said central main unit;
    a number of secondary-cell radio-based communication units, each of which is connected to said primary-cell radio-based communication unit via a respective wireless optical link and provided as a remote radio unit forming a distributed radio base station together with said central main unit, said distributed radio base station having radio transceiver functionality divided between said remote secondary-cell radio unit and said central main unit;
    means for measuring the quality of at least one of said wireless optical links; and
    means for re-directing radio traffic, if the measured wireless optical link quality associated with a secondary-cell communication unit is insufficient, from the secondary-cell communication unit to another one of said communication units within said cellular communication system;
    wherein said secondary-cell communication unit with insufficient wireless optical link quality is a micro-cell communication unit and said other communication unit is a macro-cell communication unit;
    means for causing said secondary-cell communication unit with insufficient wireless optical link quality to enter radio stand-by mode, and wherein in stand-by mode the secondary-cell communication unit is operable for locally initiating handover by reducing the RF output power.

11. The cellular communication system according to claim 10, wherein at least one of said secondary-cell communication units includes:
means for measuring the corresponding wireless optical link quality; and
means for entering the radio stand-by mode in case of insufficient wireless optical link quality.

12. The cellular communication system according to claim 1, wherein said cellular communication system comprises multiple primary-cell communication units with associated secondary-cell communication units, and said other communication unit is a primary-cell communication unit in the neighborhood of said secondary-cell communication with insufficient wireless optical link quality.

13. The cellular communication system according to claim 1, wherein the wireless optical link quality is measured in terms of at least one of signal strength, signal-to-noise ratio, and error rates at different levels of the protocol stack.

14. The cellular communication system according to claim 10, wherein a secondary cell communication unit includes means for determining a fading rate of a wireless optical signal on the corresponding wireless optical link.

15. The cellular communication system according to claim 14, wherein the secondary-cell communication unit is operable for sending a warning to the central main unit for centrally initiated handover if the determined fading rate is lower than a given threshold.

16. The cellular communication system according to claim 14, wherein the secondary-cell communication unit is operable for locally initiating handover if the determined fading rate is higher than a given threshold.

17. The cellular communication system according to claim 16, wherein the secondary-cell communication unit is operable for locally initiating handover by reducing the RF output power.

18. A cellular communication system based on a plurality of radio-based communication units, said communication system comprising:
a central main communication unit;
a primary-cell radio-based communication unit interconnected to said central main unit;
a number of secondary-cell radio-based communication units, each of which is connected to said primary-cell radio-based communication unit via a respective wireless optical link and provided as a remote radio unit forming a distributed radio base station together with said central main unit, said distributed radio base station having radio transceiver functionality divided between said remote secondary-cell radio unit and said central main unit;
a link quality analysis unit for measuring the quality of at least one of said wireless optical links;
means for re-directing radio traffic, if the measured wireless optical link quality associated with a secondary-cell communication unit is insufficient, from the secondary-cell communication unit to another one of said communication units within said cellular communication system and
means for making a determination if radio coverage of the another one of said communication units covers an area where the wireless optical link quality associated with the secondary-cell communication unit is insufficient, and if the determination is negative for increasing the radio coverage of the another one of said communication units.

19. A method of operating a cellular communication system based on a plurality of radio-based communication units, said communication system comprising a central main communication unit, a primary-cell radio-based communication unit interconnected to said central main unit, and a number of secondary-cell radio-based communication units, each of which is connected to said primary-cell radio-based communication unit via a respective wireless optical link and provided as a remote radio unit forming a distributed radio base station together with said central main unit, said distributed radio base station having radio transceiver functionality divided between said remote secondary-cell radio unit and said central main unit; the method comprising:
measuring quality of at least one of said wireless optical links;
re-directing radio traffic, if the measured wireless optical link quality associated with a secondary-cell communication unit is insufficient, from the secondary-cell communication unit to another one of said communication units within said cellular communication system;
making a determination if radio coverage of the another one of said communication units covers an area where the wireless optical link quality associated with the secondary-cell communication unit is insufficient; and
if the determination is negative, increasing the radio coverage of the another one of said communication units.

20. The method of claim 19, wherein said re-directing comprises causing handover from said secondary-cell communication unit with insufficient wireless optical link quality to said other communication unit.

21. The method of claim 19, further comprising causing said secondary-cell communication unit with insufficient wireless optical link quality to enter radio stand-by mode.

22. The method of claim 19, further comprising determining a fading rate of a wireless optical signal on the corresponding wireless optical link.

23. The method of claim 22, further comprising sending a warning to the central main unit for centrally initiated handover if the determined fading rate is lower than a given threshold.

24. The method of claim 22, further comprising locally initiating handover at the secondary-cell communication unit if the determined fading rate is higher than a given threshold.

* * * * *